US008313115B2

(12) United States Patent
Cheng

(10) Patent No.: US 8,313,115 B2
(45) Date of Patent: Nov. 20, 2012

(54) STROLLER

(75) Inventor: Kenny Cheng, Taipei (TW)

(73) Assignee: Wonderland Nurserygoods Company Limited, Central (HK)

( * ) Notice: Subject to any disclaimer, the term of this patent is extended or adjusted under 35 U.S.C. 154(b) by 251 days.

(21) Appl. No.: 12/806,031

(22) Filed: Aug. 4, 2010

(65) Prior Publication Data

US 2011/0031708 A1 Feb. 10, 2011

Related U.S. Application Data

(60) Provisional application No. 61/231,667, filed on Aug. 5, 2009.

(51) Int. Cl.
*B62B 7/14* (2006.01)
(52) U.S. Cl. .................. 280/47.38; 280/642; 280/647
(58) Field of Classification Search .............. 280/642, 280/643, 647, 648, 650, 657, 658, 47.38, 280/47.4
See application file for complete search history.

(56) References Cited

U.S. PATENT DOCUMENTS

| 6,595,583 | B2 * | 7/2003 | Hou | 297/130 |
| 7,559,606 | B2 * | 7/2009 | Hei et al. | 297/256.12 |
| 7,681,894 | B2 * | 3/2010 | Santamaria | 280/47.38 |
| 8,033,555 | B2 * | 10/2011 | Mostert et al. | 280/47.38 |

* cited by examiner

*Primary Examiner* — John Walters
(74) *Attorney, Agent, or Firm* — Hudak, Shunk & Shunk Co LPA

(57) ABSTRACT

A stroller includes a frame, a seat, two retaining mechanisms, and two retaining seats. The frame has a pair of first side portions. The seat has a bottom plate portion, a pair of second side portions, and a backrest portion. The retaining mechanisms are disposed respectively on one pair of the pair of the first side portions and the pair of the second side portions. Each of the retaining mechanisms includes a resilient pressing portion and a retaining hook. The retaining seats are disposed respectively on the other pair of the pair of the first side portions and the pair of the second side portions. Each of the retaining seats has a retaining groove engaging the corresponding retaining hook. The resilient pressing portions can be pressed to remove the retaining hooks from the retaining grooves.

8 Claims, 6 Drawing Sheets

STROLLER

CROSS-REFERENCE TO RELATED APPLICATION

This application claims priority of U.S. provisional application No. 61/231,667, filed on Aug. 5, 2009.

BACKGROUND OF THE INVENTION

1. Field of the Invention

This invention relates to a stroller, and more particularly to a stroller having a removable seat.

2. Description of the Related Art

A tandem stroller includes two seats disposed on a frame to permit two children to be seated thereon. Such a stroller is disclosed in, e.g., U.S. Pat. Nos. 6,585,284 and 6,086,087. However, in U.S. Pat. No. 6,585,284, the seats cannot be removed from the frame, and in U.S. Pat. No. 6,086,087, although the seats can be removed from the frame, the removed seats cannot be used alone.

SUMMARY OF THE INVENTION

The object of this invention is to provide a stroller with a seat that is removable and that can be used alone after it is removed.

Accordingly, a stroller of this invention includes a frame, a seat, two retaining mechanisms, and two retaining seats. The frame has a pair of first side portions. The seat has a bottom plate portion, a pair of second side portions, and a backrest portion. The retaining mechanisms are disposed respectively on one pair of the pair of the first side portions and the pair of the second side portions. Each of the retaining mechanisms includes a resilient pressing portion and a retaining hook. The retaining seats are disposed respectively on the other pair of the pair of the first side portions and the pair of the second side portions. Each of the retaining seats has a retaining groove engaging the corresponding retaining hook. The resilient pressing portions can be pressed to remove the retaining hooks from the retaining grooves, thereby allowing separation of the second side portions from the first side portions, respectively. Preferably, the seat is configured as a shell.

Since the seat is disposed removably on the frame by engagement between the retaining hooks and the retaining groove, and since the seat is a shell, it can be used alone after it is removed from the frame, thereby increasing the applicable range the seat.

BRIEF DESCRIPTION OF TEE DRAWINGS

These and other features and advantages of this invention will become apparent in the following detailed description of a preferred embodiment of this invention, with reference to the accompanying drawings, in which.

Figure 5:
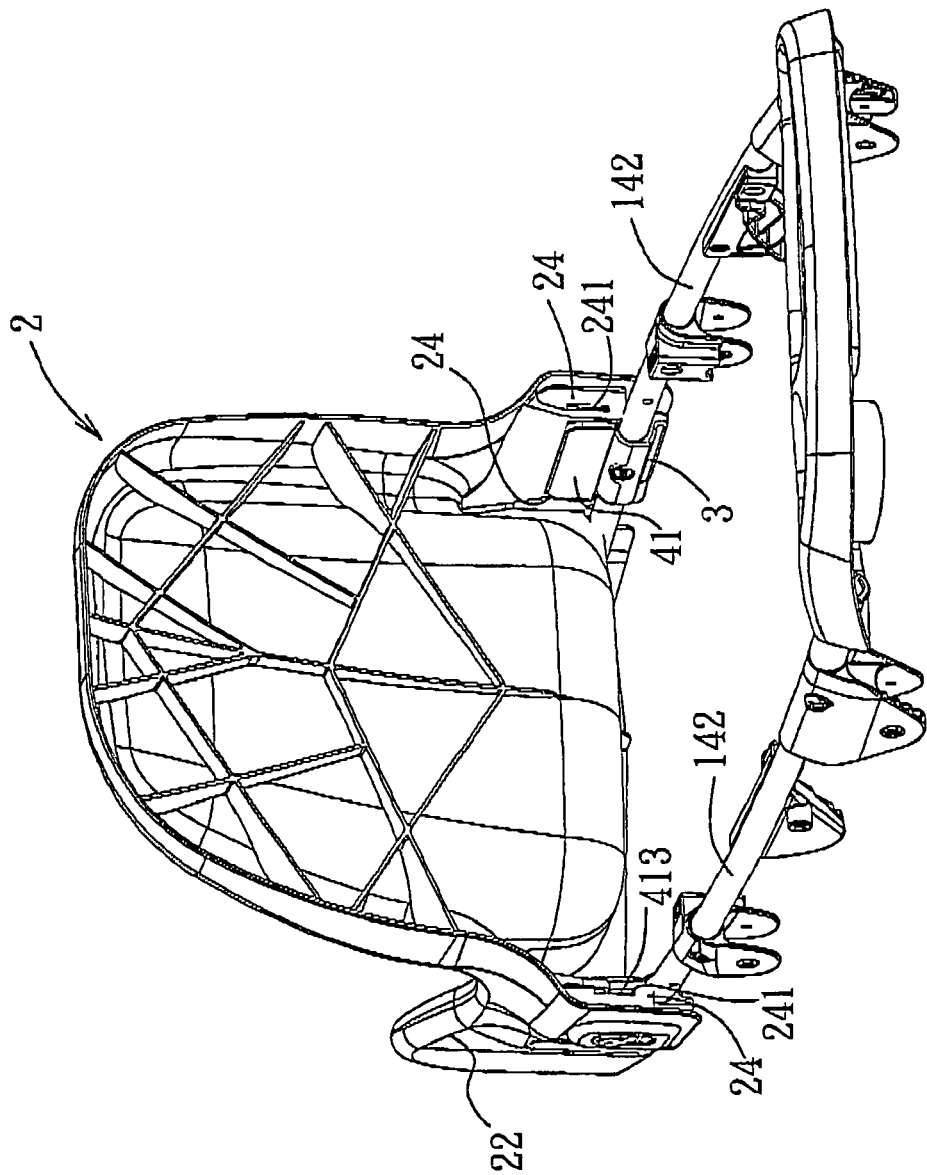
Figure 6:
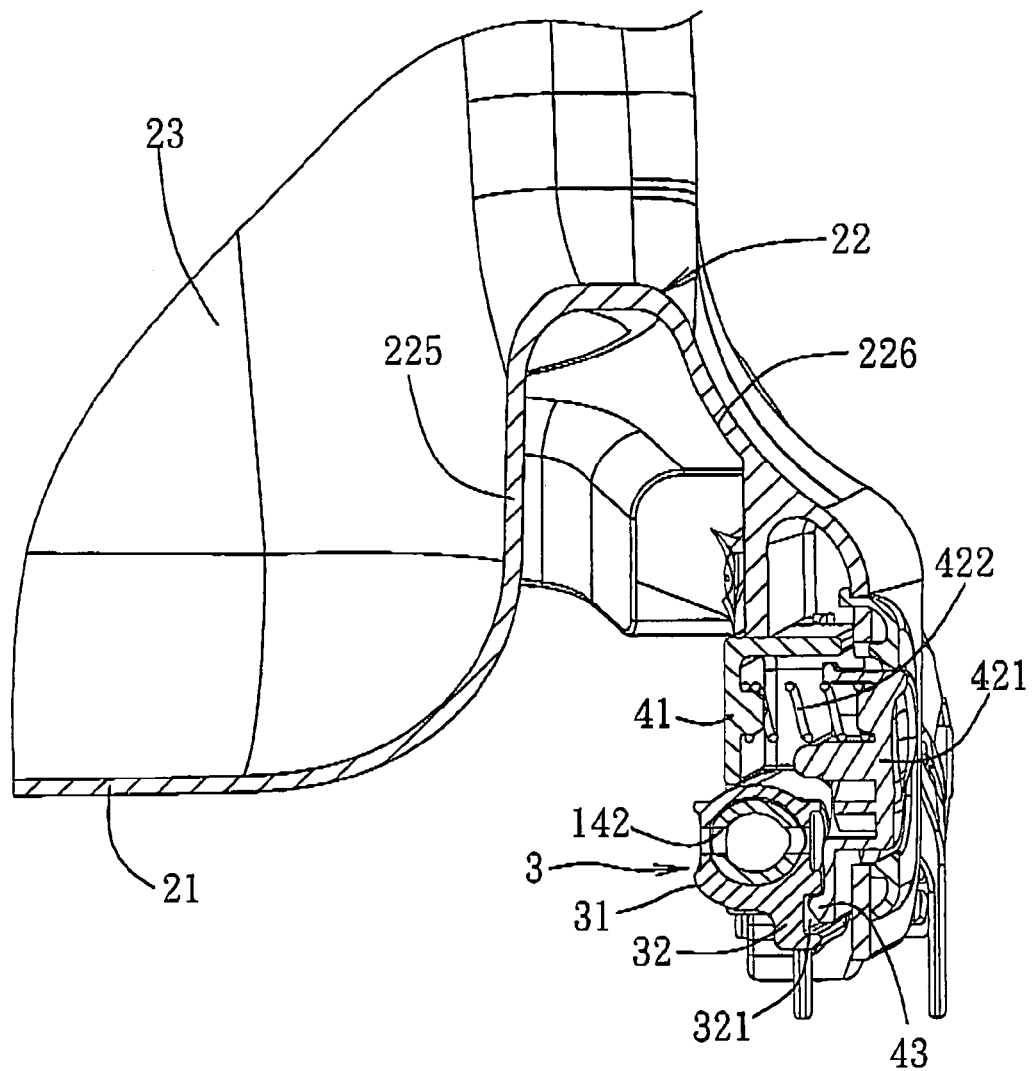

FIG. 5 an assembled rear perspective view of the seat and the first side rods of the frame of the preferred embodiment; and FIG. 6 is a fragmentary sectional view of the preferred embodiment, illustrating a connection between a retaining hook of the retaining mechanism and a retaining groove in a retaining seat.

DETAILED DESCRIPTION OF THE PREFERRED EMBODIMENT

Figure 1:
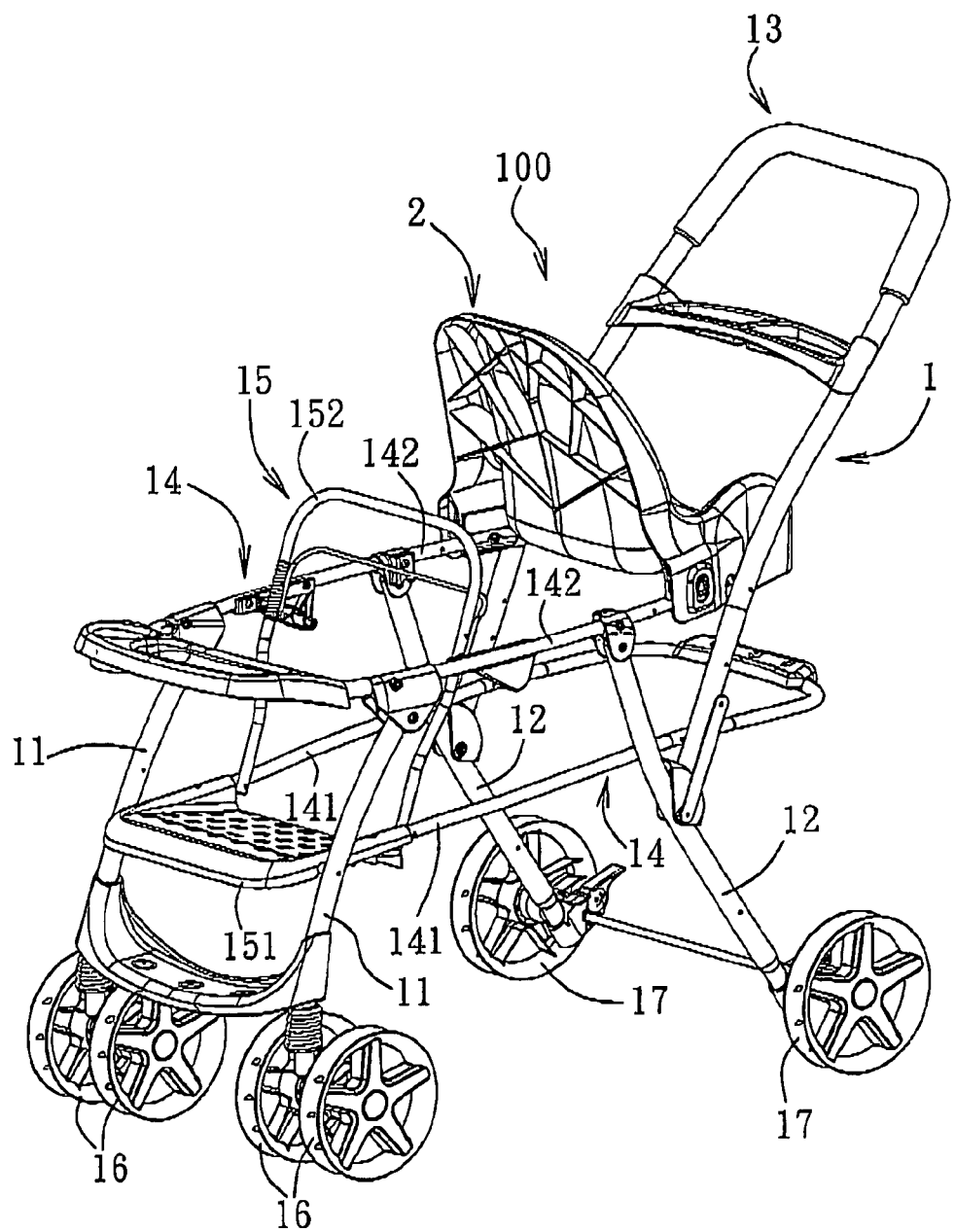
FIG. 1 is a perspective view of the preferred embodiment of a stroller according to this invention.
Figure 2:
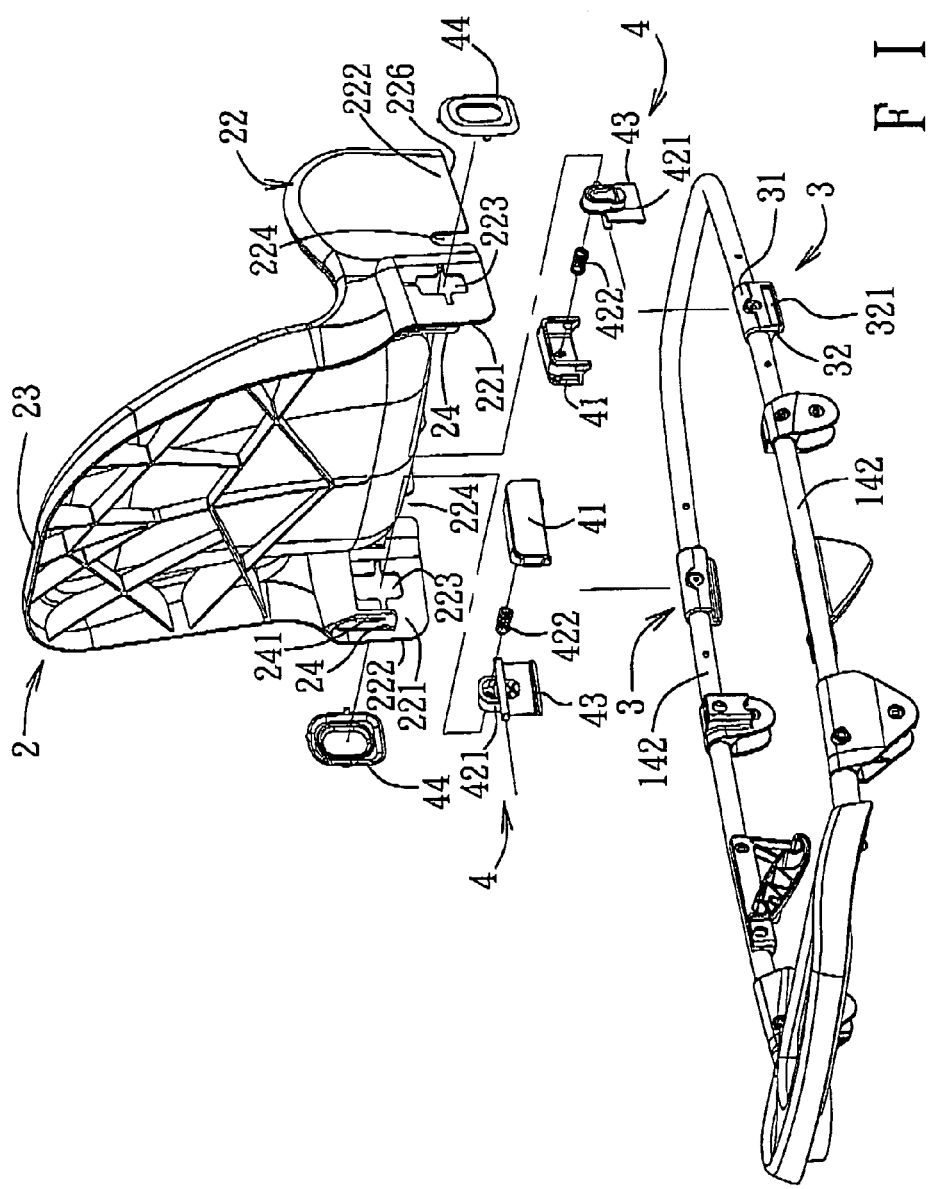
FIG. 2 is a partly exploded rear perspective view of a seat and a first side rod of a frame of the preferred embodiment.

Referring to FIGS. 1 and 2, the preferred embodiment of a stroller 100 according to this invention is a tandem stroller, and includes a frame 1, a seat 2, two retaining seats 3, and two retaining mechanisms 4.

The frame 1 includes a pair of front leg rod 11, a pair of rear leg rods 12, a push handle 13, a pair of first side portions 14, a front seat unit 15, a plurality of front wheels 16, and a plurality of rear wheels 17.

The pair of first side portions 14 include a pair of first side rods 142 and a pair of second side rods 141. The first side rods 142 extend in a front-to-rear direction, are spaced apart from each other in a left-to-right direction, and are connected respectively to two opposite ends of a rear side rod (not shown). The second side rods 141 are disposed respectively under the first side rods 142, are spaced apart from each other in the left-to-right direction, and extend in the front-to-rear direction. The front leg rods 11 have top ends connected respectively to front end portions of the first side rods 142, bottom ends mounted with the front wheels 16, and intermediate portions connected respectively and pivotally to the second side rods 141. The push handle 13 is inverted U-shaped, and has two sides each connected to the corresponding first side rod 142 and the corresponding rear leg rod 12 at two different positions, respectively.

The front seat unit 15 includes a front seat plate 151 and a front seat backrest 152. The front seat plate 151 is disposed between the front end portions of the second side rods 141, and between the front leg rods 11. The front seat backrest 152 is inverted U-shaped, are connected between the second side rods 141, and is located behind the front seat plate 151.

With particular reference to FIGS. 2 and 6, the retaining seats 3 are disposed respectively on rear portions of the first side rods 142, and are aligned with each other in the left-to-right direction. Each of the retaining seats 3 includes a tubular portion 31 sleeved on the corresponding first side rod 142, and an extension wall 32 extending downwardly from the tubular portion 31. The extension walls 32 of the retaining seats 3 have outer side surfaces that face away from each other and that are formed respectively with two aligned retaining grooves 321.

Figure 3:
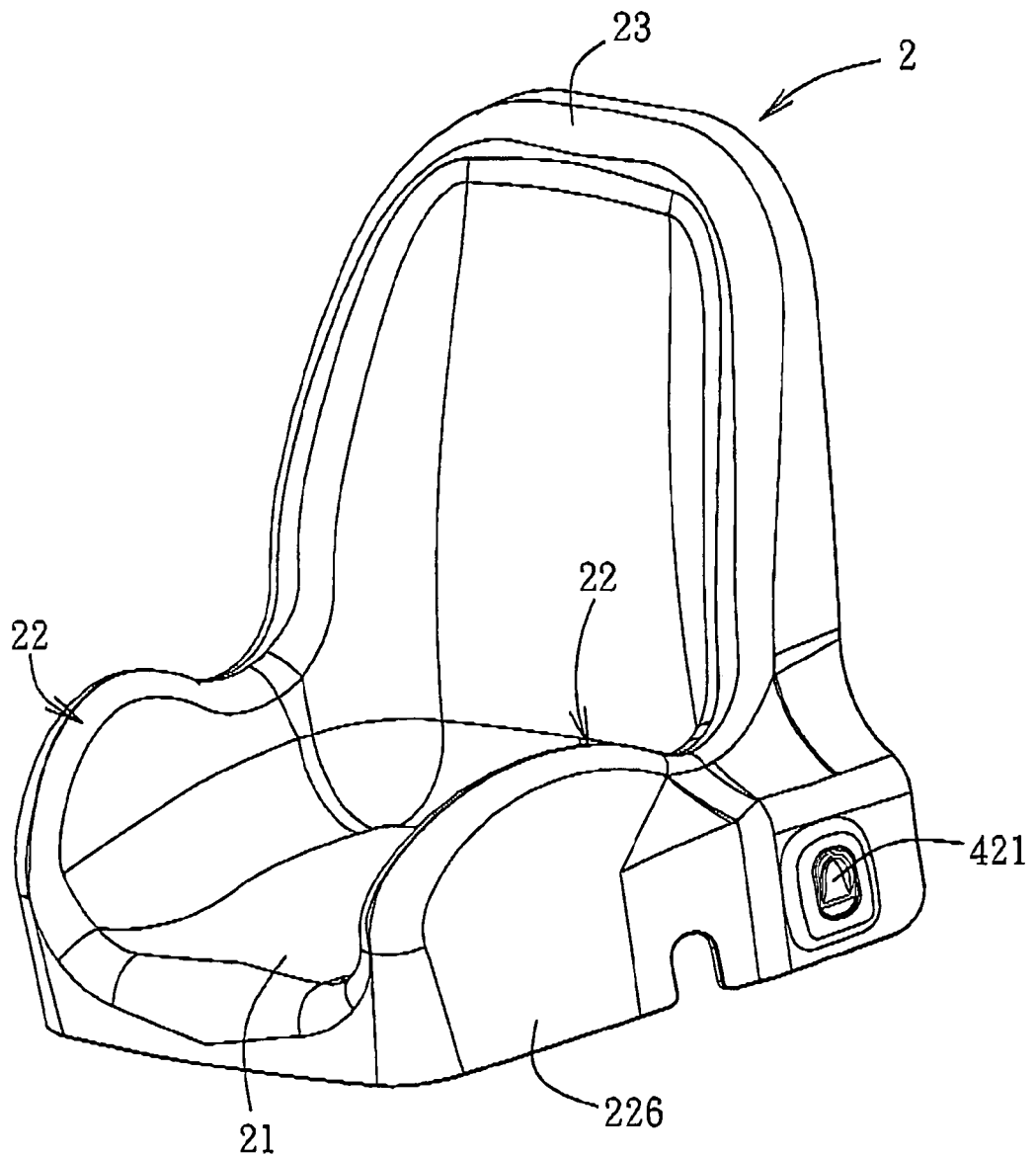
FIG. 3 is a front perspective view of the seat of the preferred embodiment.

With further reference to FIGS. 3 and 5, the seat 2 is configured as a shell made of a plastic material, and has a bottom plate portion 21, a pair of second side portions 22 extending respectively and upwardly from left and right sides of the bottom plate 21 and each having a generally inverted U-shaped cross-section, and a backrest portion 23 extending upwardly from the bottom plate portion 21 and connected between the second side portions 22. In this embodiment, each of the second side portions 22 has an inner shell wall 225 that is connected to the corresponding bottom plate portion 21, and an outer shell wall 226 that is not connected to the bottom plate portion 21 and that has opposite inner and outer side surfaces 221, 222. The outer shell wall 226 of each of the second side portions 22 is formed with an opening 223 at a position adjacent to the backrest portion 23, as shown in FIG. 2, and has a bottom side formed with a notch 224 disposed in front of the opening 223, and two positioning plates 24 (see FIG. 2) extending from the inner side surface 221 and spaced apart from each other in the front-to-rear direction, such that the opening 223 is located between the positioning plates 24. Each of the positioning plates 24 is formed with a generally vertical positioning groove 241.

Figure 4:
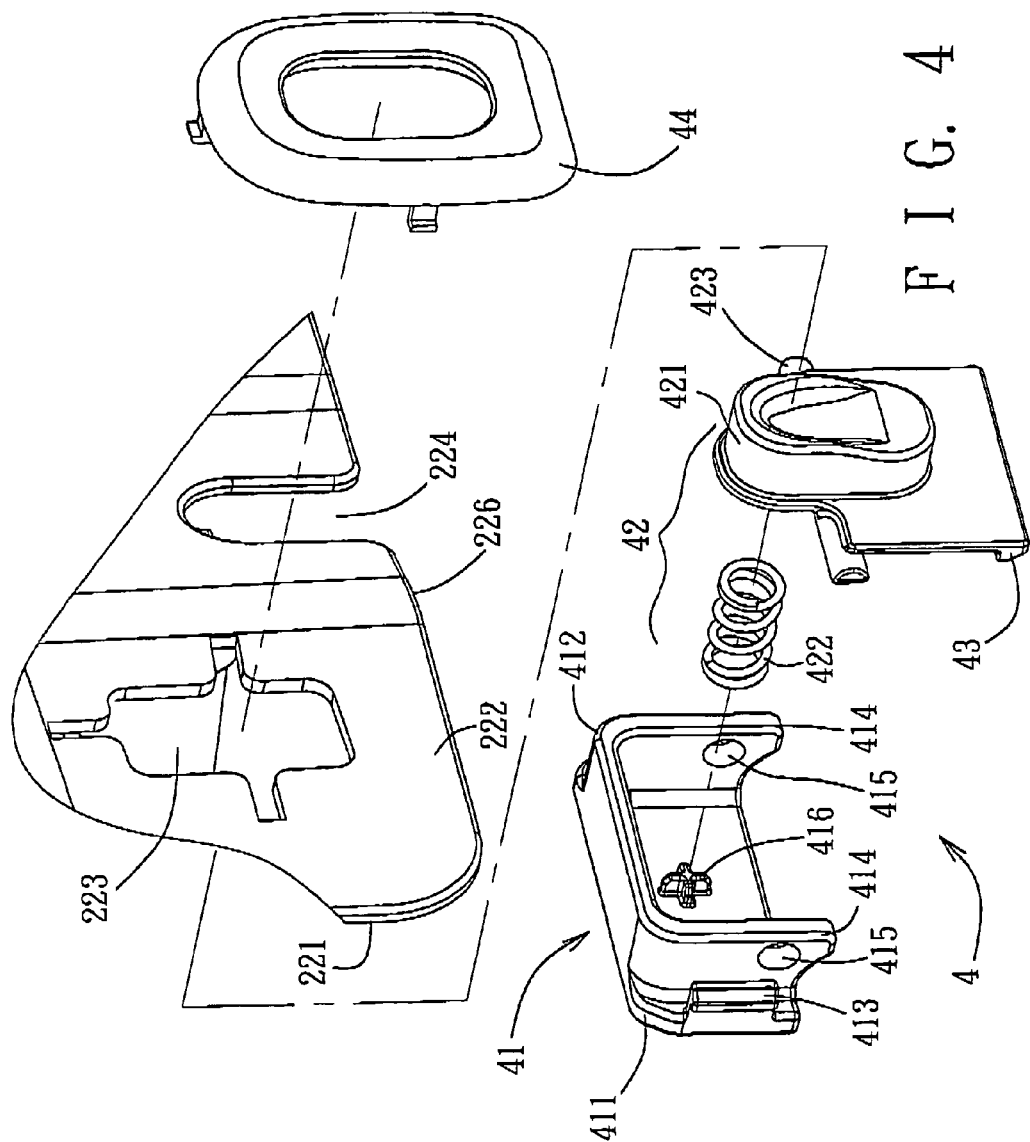
FIG. 4 is an exploded perspective view of a retaining mechanism of the preferred embodiment.

With particular reference to FIGS. 2 and 4, the retaining mechanisms 4 are disposed respectively on the outer shell wall 226 of the second side portions 22. Each of the retaining mechanisms 4 includes a seat body 91, a resilient pressing portion 42, a retaining hook 43, and an outer cover 44. One of the retaining mechanisms 4 will be described hereinafter. The seat 41 is disposed on the inner side surface 221 of the outer shell wall 226 of the second side portion 22 and between the positioning plates 24. The seat body 41 includes an upright side plate 411, a surrounding plate 412 extending from a side surface of the side plate 411, a projecting rod 416 extending from the side plate 411 and surrounded by the surrounding plate 412, and two retaining hooks 413 (only one is shown due to the viewing angle) flanking the surrounding plate 412. The surrounding plate 412 is inverted U-shaped, and has two spaced-apart upright plate sections 414. Each of the upright plate sections 414 is formed with a pivot hole 415 at a bottom end portion thereof. The upright plate sections 414 are disposed between the retaining hooks 413. The side surface of the side plate 411 formed with the surrounding plate 412 and the retaining hooks 413 faces the inner side surface 221 of the outer shell wall 226 of the corresponding second side portion 22. The retaining hooks 413 engage respectively the positioning grooves 241 in the positioning plates 24 to thereby fix the seat body 41 between the positioning plates 24.

The resilient pressing portion 42 includes a cap 421, a spring 422, and a pivot pin 423. The pivot pin 423 is connected integrally to an inner side of the cap 421, and extends horizontally through the pivot holes 415 in the upright plate sections 414 of the seat body 41, so that the cap 421 is connected pivotally between the upright plate sections 414. The cap 421 is exposed from the corresponding second side portion 22 via the corresponding opening 223. The spring 422 has one end sleeved on the projecting rod 916 of the seat body 41 and abutting against the side plate 911 of the seat body 41, and the other end abutting against the inner side of the cap 421. As such, the cap 921 projects resiliently from the corresponding opening 223 to thereby allow for manual operation. The spring 422 abuts against the inner side of the cap 421 at a position above the pivot pin 423 such that, when the area of the outer side of the cap 921 disposed above the pivot pin 423 is pressed, the cap 421 rotates about the pivot pin 923. The retaining hook 43 is configured as a plate, extends downwardly from the cap 91, and is disposed below the pivot pin 423. As such, when the cap 421 is connected pivotally between the seat body 41 and the outer shell wall 226 of the corresponding second side portion 22, the retaining hook 43 is disposed on the inner side surface 221 of the outer shell wall 226 of the corresponding second side portion 22. The outer cover 44 is loop-shaped, and is connected fixedly to the outer side surface 222 of the corresponding second side portion 22 so as to cover an inner periphery of the opening 223, while allowing for exposure of the cap 921, thereby maintaining a good appearance of the outer side surface 222 of the corresponding second side portion 22.

With particular reference to FIG. 3, since the seat 2 is made of a plastic material, when not assembled to the frame 1, it can be placed on any supporting member, adult chair, stool, floor, or support frame which is provided with the retaining seats 3.

With particular reference to FIGS. 4 and 5, when it is desired to assemble the seat 2 to the frame 1, the seat 2 is first placed on the frame 1 such that the seat 2 faces a rear end of the frame 1 and the second side portions 22 are disposed respectively on the first side rods 142. Next, the retaining hooks 43 of the retaining mechanisms 4 are engaged respectively within the retaining grooves 321 in the retaining seats 3, so that the seat 2 is fixed on the frame 1. In this state, rear end portions of the first side rods 142 are disposed below the bottom plate portion 21 of the seat 2, and each of the notches 224 in the second side portions 22 of the seat 2 is provided to allow for extension of a juncture between the corresponding side of the push handle 13 and the corresponding first side rod 142. With particular reference to FIGS. 1 and 6, the seat 2 is supported by the first side rods 142 and the seat bodies 41, and is protected by the push handle 13 due to the fact that the sides of the push handle 13 are external to and in proximity to the second side portions 22 of the seat 2, respectively. Alternatively, the seat 2 may be designed to face forwardly according to the need of the user.

When separation of the seat 2 from the frame 1 is desired, the portions of the caps 421 disposed above the pivot pins 423 are pressed to rotate against the biasing actions of the compression springs 422 so as to remove the retaining hooks 43 from the retaining grooves 321, respectively, thereby allowing the seat 2 to be removed from the frame 1.

In alternative embodiments, the backrest portion 23 of the seat 2 may be rotatable relative to the bottom plate portion 21 to thereby allow for recline adjustment, the seat 2 may be provided with a fastening device (e.g., binding strap) so that it can be fastened to other object (such as another seat) when used alone, bottom surfaces of the second side portions 22 or the bottom plate portion 21 of the seat 2 may be provided with an anti-slip pad to avoid sliding movement of the seat 2 on a supporting surface when the seat 2 is used on an object having the supporting surface, and the backrest portion 23 and the bottom plate portion 21 of the seat 2 may include belt-receiving holes and a safety belt extending through the belt-receiving holes to promote safety during use of the seat 2.

In summary, since the frame 1 and the seat 2 are interconnected by engagement of the retaining hooks 43 within the retaining grooves 321, respectively, and since the seat 2 is configured as a shell, the seat 2 can be used alone or mounted to the frame 1 to serve as a seat of a stroller, thereby increasing the applicable range of the seat 2.

With this invention thus explained, it is apparent that numerous modifications and variations can be made without departing from the scope and spirit of this invention. It is therefore intended that this invention be limited only as indicated by the appended claims.

I claim:

1. A stroller comprising:
a frame having a pair of first side portions;
a seat having a bottom plate portion, a pair of second side portions, and a backrest portion, said second side portions and said backrest portion being connected to said bottom plate portion;
two retaining mechanisms disposed respectively on one pair of the pair of said first side portions and the pair of said second side portions, each of said retaining mechanisms including a resilient pressing portion and a retaining hook connected to said resilient pressing portion; and two
retaining seats disposed respectively on the other pair of the pair of said first side portions and the pair of said second side portions, each of said retaining seats being formed with a retaining groove permitting a respective one of said retaining hooks of said retaining mechanisms to be engaged therein so as to connect said first side portions to said second side portions, respectively, said resilient pressing portions of said retaining mechanisms being pressable to remove said retaining hooks from said retaining grooves in said retaining seats, respectively, thereby allowing for separation of said second side portions of said seat from said first side portions of said frame, respectively;

wherein each of said second side portions of said seat is formed with an opening, each of said retaining mechanisms further including a seat body disposed on a respective one of said second side portions of said seat each of said resilient pressing portions being disposed between said seat body of a corresponding one of said retaining mechanisms and a corresponding one of said second side portions of said seat and exposed from said opening in the corresponding one of said second side portions.

2. The stroller as claimed in claim 1, wherein each of said resilient pressing portions includes a spring and a cap connected pivotally to said seat body of the corresponding one of said retaining mechanisms and exposed from said opening in the corresponding one of said second side portions, said spring of each of said resilient pressing portions being disposed between and abutting against said seat body of the corresponding one of said retaining mechanisms and said cap of a corresponding one of said resilient pressing portions, said retaining hooks extending respectively and downwardly from said caps of said resilient pressing portions.

3. The stroller as claimed in claim 2, wherein said seat body of each of said retaining mechanisms includes an upright side plate, and an inverted U-shaped surrounding plate extending from a side surface of said side plate and having two spaced-apart upright plate sections, between which a corresponding one of said caps is disposed pivotally, said springs of said resilient pressing portions abutting against said side plates, respectively.

4. The stroller as claimed in claim 3, wherein each of said second side portions has opposite inner and outer side surfaces, and two positioning plates extending from said inner side surface, such that said seat body of a corresponding one of said retaining mechanisms is confined between the two positioning plates.

5. The stroller as claimed in claim 4, wherein each of said positioning plates has a positioning groove permitting said seat body of a corresponding one of said retaining mechanisms to be engaged therein.

6. The stroller as claimed in claim 2, wherein each of said first side portions of said frame includes a pair of first side rods spaced apart from each other in a left-to-right direction, said retaining seats being disposed respectively on said first side rods, each of said retaining seats including a tube portion sleeved on a corresponding one of said first side rods, and an extension wall extending downwardly from said tube portion and formed with a corresponding one of said retaining grooves.

7. The stroller as claimed in claim 6, wherein each of said retaining mechanisms further includes a loop-shaped outer cover disposed on a corresponding one of said second side portions and permitting a corresponding one of said caps to be exposed therefrom.

8. The stroller as claimed in claim 1, wherein said seat is configured as a shell, and each of said second side portions is configured as an inverted U-shaped shell wall.

* * * * *